2,924,611
OXYGENATED DERIVATIVES OF 4,6-PREGNADIENE-3,20-DIONE

Raymond M. Dodson, Park Ridge, and Robert C. Tweit, Wilmette, Ill., assignors to G. D. Searle & Co., Chicago, Ill., a corporation of Delaware No Drawing. Application February 17, 1959
Serial No. 793,670

5 Claims. (Cl. 260—397.3)

The present invention relates to novel oxygenated derivatives of 4,6-pregnadiene-3,20-dione in which the oxygen-containing substituent is located in the 14- or 15-position. The compounds of this invention are represented by the structural formula

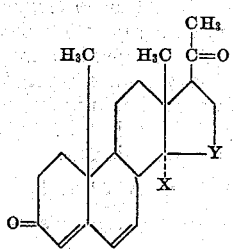

wherein Y is a methylene radical when X is an α-hydroxy radical and Y is selected from the group consisting of -hydroxymethylene, -(lower alkanoyloxy)methylene, and carbonyl radicals when X is hydrogen. The radicals comprehended by the term "lower alkanoyl" are formyl, acetyl, propionyl, butyryl, valeryl, caproyl, enanthyl, caprylyl, and branched-chain isomers thereof, said alkanoyl radicals being the acyl radicals of alkanoic acids containing fewer than nine carbon atoms.

The 14α-hydroxy- and 15-hydroxy-4,6-pregnadiene-3,20-diones of the present invention are prepared from progesterone by a two-step process. The first step consists of a fermentative hydroxylation of progesterone with the appropriate organism, followed by isolation of the product to yield a dihydroxyprogesterone. For example, a fermentation mixture containing progesterone is incubated with the organism *Mucor hiemalis* N.R.R.L. 2684 and the product isolated to afford 7α,14α-dihydroxyprogesterone. The second step consists of dehydration of the dihydroxyprogesterone by treating the latter with a solution of an alkali hydroxide in methanol and isolating the product, resulting in the hydroxy-4,6-pregnadiene-3,20-diones of the present invention. As a specific example, 7α,14α-dihydroxyprogesterone is treated with a solution of potassium hydroxide in methanol and the product isolated to afford 14α-hydroxy-4,6-pregnadiene-3,20-dione.

Oxidation of 15β-hydroxy-4,6-pregnadiene-3,20-dione, for example with chromium trioxide in pyridine solution, results in 4,6-pregnadiene-3,15,20-trione, also a compound of this invention.

The 15-alkanoyloxy-4,6-pregnadiene-3,20-diones of the present invention are prepared by treating the corresponding alcohol with an alkanoic acid anhydride, and isolating the product. For example, treating 15-hydroxy-4,6-pregnadiene-3,20-dione with acetic anhydride in pyridine solution and isolating the product yields 15-acetoxy-4,6-pregnadiene-3,20-dione.

The compounds of the present invention possess valuable pharmacological properties in consequence of their anti-hormonal activity. They inhibit the sodium-retaining activity of desoxycorticosterone. They are useful also as intermediates in the preparation of the corresponding 7-acylthio-4-pregnene-3,20-diones, disclosed in applicants' pending application Serial No. 732,453, filed May 2, 1958. The latter compounds are potent anti-inflammatory and progestational agents.

This invention will appear more fully from the examples which follow. These examples are set forth by way of illustration only and it will be understood that the invention is not to be construed as limited in spirit or in scope by the details contained therein, as many modifications in materials and in methods will be apparent from this disclosure to those skilled in the art. In these examples temperatures are given in degrees centigrade (° C.) and quantities of materials are expressed in parts by weight unless otherwise noted.

EXAMPLE 1

*14α-hydroxy-4,6-pregnadiene-3,20-dione*

A stainless steel fermentation tank having a capacity of about 40,000 volumes is charged with a solution of 1,000 parts of dextrose, 200 parts of a commercial cottonseed meal flour, 90 parts of corn steep liquor and 12 parts of concentrated hydrochloric acid in 25,000 parts of tap water. Five parts of an anti-foaming agent, suitably of a silicone type, are added and the contents of the vessel are sterilized by the addition of live steam under pressure to a temperature of about 110–120° and a final volume of about 30,000 volumes. The contents of the fermentor are cooled and inoculated with a spore suspension of *Mucor hiemalis* N.R.R.L. 2684. The contents of the fermentor are kept agitated by a stirrer operating at about 200 to 300 revolutions per minute. A stream of sterilized air is introduced through an inlet tube into the contents of the fermentor at a rate of 20,000 to 35,000 volumes of air per minute, measured by means of a rotameter placed in the sterile portion of the air line. Growth of the organism is allowed to continue for 46 hours at a temperature of about 25°. During this period of incubation, additional small portions of anti-foam agent are added as necessary. A solution of 10 parts of progesterone in 600 parts of ethanol is added and fermentation in the presence of the steroid substrate is continued for an additional 20 hours at 25° with the same rates of stirring and aeration. The contents of the fermentor are stirred with 24,000 parts of methylene chloride for 1 hour. The mycelium is then separated by filtration and washed with about twice its volume of methylene chloride. The methylene chloride extracts are combined and concentrated under reduced pressure to about 600 parts by volume, filtered and further concentrated to dryness. The residue is triturated with ether, followed by warm acetone-ether to remove 6,14-dihydroxyprogesterone, and the residue crystallized from methanol-acetone to yield 7α,14α-dihydroxyprogesterone, M.P. 234–238°.

A solution of 2 parts of 7α,14α-dihydroxyprogesterone, 3 parts of potassium hydroxide and 400 parts of methanol is allowed to stand overnight. The reaction mixture is made neutral with acetic acid, concentrated in vacuo to 25 parts by volume, diluted with 100 parts of water and the precipitate of 14α-hydroxy-4,6-pregnadiene-3,20-dione which forms is recovered; M.P. 177–178°.

EXAMPLE 2

*15β-hydroxy-4,6-pregnadiene-3,20-dione*

A stainless steel fermentation tank having a capacity of about 400,000 volumes is charged with a solution prepared by boiling 1200 parts of a commercial cottonseed meal flour, 500 parts of corn steep liquor and 50 parts of concentrated hyrochloric acid in about 20,000 parts of tap water. The resulting solution is cooled and filtered. Five-thousand parts of dextrose and 10 parts of an anti-foam agent, suitably of a silicone type, are added and the volume is brought up to 180,000 volumes in the fermentor. The contents of the vessel are sterilized by the addition of live steam under pressure to a temperature of about 110–120°. The contents of the fermentor are cooled and inoculated with a spore suspension of Penicillium sp., A.T.C.C. 12,556. The contents of the fermentor are kept agitated by a stirrer operating at about 150 revolutions per minute and a stream of sterilized air is introduced into the medium through an inlet tube at the rate from 40,000 to 50,000 volumes of air per minute. This rate of aeration is measured by means of a rotameter placed in the sterile portion of the air line. Growth of the organism is allowed to continue for 52½ hours at a temperature of about 25°. During this period, additional amounts of anti-foam agent are added as required. A solution of 50 parts of progesterone in 1200 parts of ethanol is added and fermentation in the presence of the steroid substrate is continued for an additional 13 hours. The mycelium is separated in a basket type centrifuge and washed with about twice its volume of methylene chloride. The aqueous filtrate is extracted twice by stirring with portions of methylene chloride of approximately 130,000 parts. The methylene chloride extracts are combined and reduced to about 8,000 volumes by distillation of the solvent at atmospheric pressure. The concentrate is filterd and reduced to about 670 volumes by distillation at atmospheric pressure and then in vacuo to dryness. The residue is triturated with petroleum ether, ether and acetone and the residue crystallized from acetone to yield 7β,15β-dihydroxyprogesterone, M.P. 226–228°; specific rotation +122°; ultra-violet extinction coefficient 15,900 at 240.5 millimicrons.

A solution of 2 parts of 7β,15β-dihydroxy-progesterone and 2 parts of sodium hydroxide in 400 parts of methanol is allowed to stand for 60 hours. The reaction mixture is made neutral with 3 parts of acetic acid and concentrated in vacuo. The residue is diulted with water and the solid collected and crystallized from acetone to yield 15β-hydroxy-4,6-pregnadiene-3,20-dione; M.P. 214–216°; ultra-violet extinction coefficient 26,300 at 284 millimicrons.

EXAMPLE 3

4,6-pregnadiene-3,15,20-trione

A solution of 3 parts of 15β-hydroxy-4,6-pregnadiene-3,20-dione and 40 parts of pyridine is added to a mixture of 3 parts of chromium trioxide in 30 parts of pyridine. The resultant dark mixture is allowed to stand for 24 hours, diluted with 400 parts of water and filtered through diatomaceous earth. The residue and filtrate are both extracted three times with a total of 500 parts of a 1:1 ether-benzene solution. The combined extracts are washed with water and concentrated to dryness in vacuo to yield 4,6-pregnadiene-3,15,20-trione which melts at 197–199° after crystallization from acetone.

EXAMPLE 4

15β-acetoxy-4,6-pregnadiene-3,20-dione

A mixture of 1 part of 15β-hydroxy-4,6-pregnadiene-3,20-dione, 10 parts of acetic anhydride, and 20 parts of pyridine is warmed on the steam bath to achieve solution, then allowed to stand at room temperature for 1 week. The solution is poured into water; the resultant mixture neutralized with sodium carbonate and extracted with methylene chloride. The extract is washed with water and evaporated to dryness in vacuo. Chromatography on silica gel followed by elution with a 10% ethyl acetate-90% benzene solution affords 15β-acetoxy-4,6-pregnadiene-3,20-dione. This material exhibits a maximum in the ultra-violet at about 284 millimicrons and posseses maxima in the infra-red at about 5.7, 5.8, 6.0, 6.2, 6.3 and 8.0 microns.

EXAMPLE 5

15β-valeryloxy-4,6-pregnadiene-3,20-dione

A solution of 1 part of 15β-hydroxy-4,6-pregnadiene-3,20-dione and 18 parts of valeric anhydride in 30 parts of pyridine is heated on the steam bath for two hours, then allowed to stand at room temperature for 10 days. The reaction mixture is diluted with water, neutralized with sodium carbonate and extracted with methylene chloride. The organic layer is washed with water and evaporated to dryness in vacuo leaving a residue which is purified by chromatography on silica gel followed by elution with an ethyl acetate-benzene solution resulting in pure 15β-valeryloxy-4,6-pregnadiene-3,20-dione. This material possesses a maximum in the ultra-violet at about 284 millimicrons and maxima in the infra-red at about 5.7, 5.8, 6.0, 6.2 and 6.3 microns.

EXAMPLE 6

15α-hydroxy-4,6-pregnadiene-3,20-dione

A solution of 5 parts of 15α-hydroxyprogesterone, 5 parts of chloranil, and 0.1 part of p-toluenesulfonic acid monhydrate in 450 parts of xylene is heated at reflux for 3 hours. The reaction mixture is chromatographed on silica gel and eluted with a 40% ethyl acetate-60% benzene solution. Removal of the solvent in vacuo yields 15α-hydroxy-4,6-pregnadiene-3,20-dione which exhibits maxima in its ultra-violet absorption spectrum at 283 millimicrons and in its infra-red absorption spectrum at 2.9, 5.85, 6.0, 6.2 and 6.3 microns.

What is claimed is:

1. A compound of the structural formula

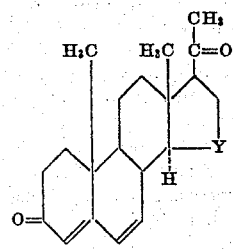

wherein Y is selected from the group consisting of β-hydroxymethylene, β-(lower alkanoyloxy)methylene, and carbonyl radicals.

2. 15β-hydroxy-4,6-pregnadiene-3,20-dione.
3. 4,6-pregnadiene-3,15,20-trione.
4. 15β-acetoxy-4,6-pregnadiene-3,20-dione.
5. 15α-hydroxy-4,6-pregnadiene-3,20-dione.

No references cited.